(12) United States Patent
Reynolds

(10) Patent No.: US 12,052,374 B2
(45) Date of Patent: Jul. 30, 2024

(54) SYSTEM AND METHODS FOR VERIFYING A CRYPTOGRAPHIC ACCESS CODE

(71) Applicant: QuSecure, Inc., San Mateo, CA (US)

(72) Inventor: Mark C. Reynolds, Concord, MA (US)

(73) Assignee: QuSecure, Inc, San Mateo, CA (US)

( * ) Notice: Subject to any disclaimer, the term of this patent is extended or adjusted under 35 U.S.C. 154(b) by 240 days.

(21) Appl. No.: 17/892,649

(22) Filed: Aug. 22, 2022

(65) Prior Publication Data

US 2024/0022436 A1    Jan. 18, 2024

Related U.S. Application Data

(60) Provisional application No. 63/389,350, filed on Jul. 14, 2022.

(51) Int. Cl.
*H04L 9/32*     (2006.01)
*H04L 9/08*     (2006.01)
*H04L 9/30*     (2006.01)

(52) U.S. Cl.
CPC .......... *H04L 9/3268* (2013.01); *H04L 9/0825* (2013.01); *H04L 9/0852* (2013.01)

(58) Field of Classification Search
CPC ................. H04L 9/3268; H04L 9/0825; H04L 9/0852; H04L 9/304; H04L 9/3093; H04L 9/3265
See application file for complete search history.

(56) References Cited

U.S. PATENT DOCUMENTS

| | | | |
|---|---|---|---|
| 6,456,716 B1 * | 9/2002 | Arnold | H04L 9/321 |
| | | | 380/30 |
| 7,797,281 B1 * | 9/2010 | Greene | G06F 11/1469 |
| | | | 707/675 |
| 10,742,420 B1 * | 8/2020 | Griffin | H04L 9/3093 |
| 11,122,346 B1 * | 9/2021 | Kumar | H04L 63/0853 |
| 11,240,014 B1 * | 2/2022 | Maganti | H04L 9/002 |
| 2007/0130621 A1 * | 6/2007 | Marinescu | G06F 21/52 |
| | | | 726/25 |
| 2008/0307494 A1 * | 12/2008 | Holtzman | G06F 21/725 |
| | | | 726/2 |
| 2010/0115267 A1 * | 5/2010 | Guo | H04L 9/3268 |
| | | | 713/156 |
| 2013/0132718 A1 * | 5/2013 | Agrawal | H04L 9/3268 |
| | | | 713/178 |

(Continued)

*Primary Examiner* — Darren B Schwartz

(74) *Attorney, Agent, or Firm* — Barry Van Hooser; Baruch Feldman; Derek Jennings

(57) ABSTRACT

A system and method for verifying a cryptographic access code is provided. If a set of cryptographic access components are quantum-aware, the system can obtain a post-quantum encryption and/or decryption algorithm from a context-specific non-critical extension in a private OID namespace, such as SABER, Kyber, Enhanced McEliece, or RLCE. If the set of cryptographic access components are quantum-aware, the system can obtain a post-quantum signature or verification algorithm from the private OID namespace. The system can validate a root of trust specified in a TAL record; confirm that a respective certificate, CRL, or TAL is specified in at least one Manifest record; confirm that a hash of the respective certificate, CRL, or TAL matches a recorded hash in a respective Manifest listing the respective certificate, CRL, or TAL; and confirm that a respective CRL or Manifest is fresh.

24 Claims, 7 Drawing Sheets

(56) References Cited

U.S. PATENT DOCUMENTS

| | | | |
|---|---|---|---|
| 2021/0377049 A1* | 12/2021 | Nix | H04L 9/14 |
| 2022/0138349 A1* | 5/2022 | Saarinen | H04L 9/50 |
| | | | 713/192 |
| 2022/0278855 A1* | 9/2022 | Jacquin | H04L 9/3271 |
| 2023/0261854 A1* | 8/2023 | Dottax | H04L 9/3226 |
| | | | 380/278 |

* cited by examiner

SYSTEM AND METHODS FOR VERIFYING A CRYPTOGRAPHIC ACCESS CODE

The applicant claims the benefit under 35 USC 119(e) of U.S. Provisional Application No. 63/389,350 filed on Jul. 14, 2022 which is incorporated herein by reference in its entirety.

BACKGROUND

The development of non-classical computers, such as quantum computers, may pose a threat to existing encryption algorithms. There is a need for improved security systems that may be more resilient to non-classical computers.

SUMMARY

In an aspect, the present disclosure provides a method of verifying a cryptographic access code. The method of verifying a cryptographic access code may comprise, responsive to a set of cryptographic access components being quantum-aware, obtaining a post-quantum encryption or decryption algorithm from a context-specific non-critical extension in a private Object Identifier (OID) namespace. The post-quantum encryption or decryption algorithm can comprise at least one of: SABER; Kyber; Enhanced McEliece; or Random Linear Code Encryption Scheme (RLCE). The method may further comprise, responsive to the set of cryptographic access components being quantum-aware, obtaining a post-quantum signature identifier or verification algorithm identifier from the private OID namespace. The method may further comprise validating a root of trust specified in a Trust Anchor Locator (TAL) record. The method may further comprise confirming that a respective certificate, Certificate Revocation List (CRL), or TAL is specified in at least one Manifest record. The method may further comprise confirming that a hash of the respective certificate, CRL, or TAL matches a recorded hash associated with the respective certificate, CRL, or TAL in a respective Manifest listing the respective certificate, CRL, or TAL. The method may further comprise confirming that a respective CRL or Manifest is fresh.

In some embodiments, the post-quantum signature or verification algorithm identifier is obtained from a second private OID namespace.

In some embodiments, the method may further comprise communicating with instructions executed by an access or authorization device. The set of cryptographic access components may include the instructions.

In some embodiments, the access or authorization device can comprise a Cryptographic Access Card (CAC).

In some embodiments, the private OID namespace is stored in the access or authorization device.

In some embodiments, the access or authorization device can comprise a payment card.

In some embodiments, the method may further comprise, responsive to the set of cryptographic access components not being quantum-aware, obtaining an interoperable non-quantum encryption or decryption algorithm identifier.

In some embodiments, the method may further comprise checking specification compliance of a public key infrastructure (PKI) object. The method may further comprise discovering a path from a certificate to the root of trust. The method may further comprise computationally validating the path.

In another aspect, the present disclosure provides a computing system configured to verify a cryptographic access code. The computing system can comprise a memory and at least one processor coupled to the memory and configured, responsive to a set of cryptographic access components being quantum-aware, to obtain a post-quantum encryption or decryption algorithm from a context-specific non-critical extension in a private OID namespace. The post-quantum encryption or decryption algorithm can comprise at least one of: SABER; Kyber; Enhanced McEliece; or RLCE. The processor can be further configured, responsive to the set of cryptographic access components being quantum-aware, to obtain a post-quantum signature or verification algorithm from the private OID namespace. The processor can be further configured to validate a root of trust specified in a TAL record. The processor can be further configured to confirm that a respective certificate, CRL, or TAL is specified in at least one Manifest record. The processor can be further configured to confirm that a hash of the respective certificate, CRL, or TAL matches a recorded hash associated with the respective certificate, CRL, or TAL in a respective Manifest listing the respective certificate, CRL, or TAL. The processor can be further configured to confirm that a respective CRL or Manifest is fresh.

In another aspect, the present disclosure provides a non-transitory computer readable medium storing executable sequences of instructions to verify a cryptographic access code. The executable sequences of instructions can comprise instructions, responsive to a set of cryptographic access components being quantum-aware, to specify a post-quantum encryption or decryption algorithm within a context-specific non-critical extension in a private OID namespace. The post-quantum encryption or decryption algorithm can comprise at least one of: SABER; Kyber; Enhanced McEliece; or RLCE. The executable sequences of instructions can further comprise instructions, responsive to the set of cryptographic access components being quantum-aware, to specify a post-quantum signature or verification algorithm within the private OID namespace. The executable sequences of instructions can further comprise instructions to specify a root of trust within a TAL record. The executable sequences of instructions can further comprise instructions to specify a respective certificate, CRL, or TAL in at least one Manifest record. The executable sequences of instructions can further comprise instructions to provide a hash of the respective certificate, CRL, or TAL, wherein the hash matches a recorded hash associated with the respective certificate, CRL, or TAL in a respective Manifest listing the respective certificate, CRL, or TAL. The executable sequences of instructions can further comprise instructions to provide a future update field for a respective CRL or Manifest.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede or take precedence over any such contradictory material.

BRIEF DESCRIPTION OF THE DRAWINGS

The novel features of the disclosed system and methods are set forth with particularity in the appended claims. A better understanding of the features and advantages of the present system and methods will be obtained by reference to the following detailed description that sets forth illustrative embodiments, in which the principles of the disclosed system and methods are utilized, and the accompanying drawings (also "Figure" and "FIG." herein), of which:

DETAILED DESCRIPTION

Figure 1A:
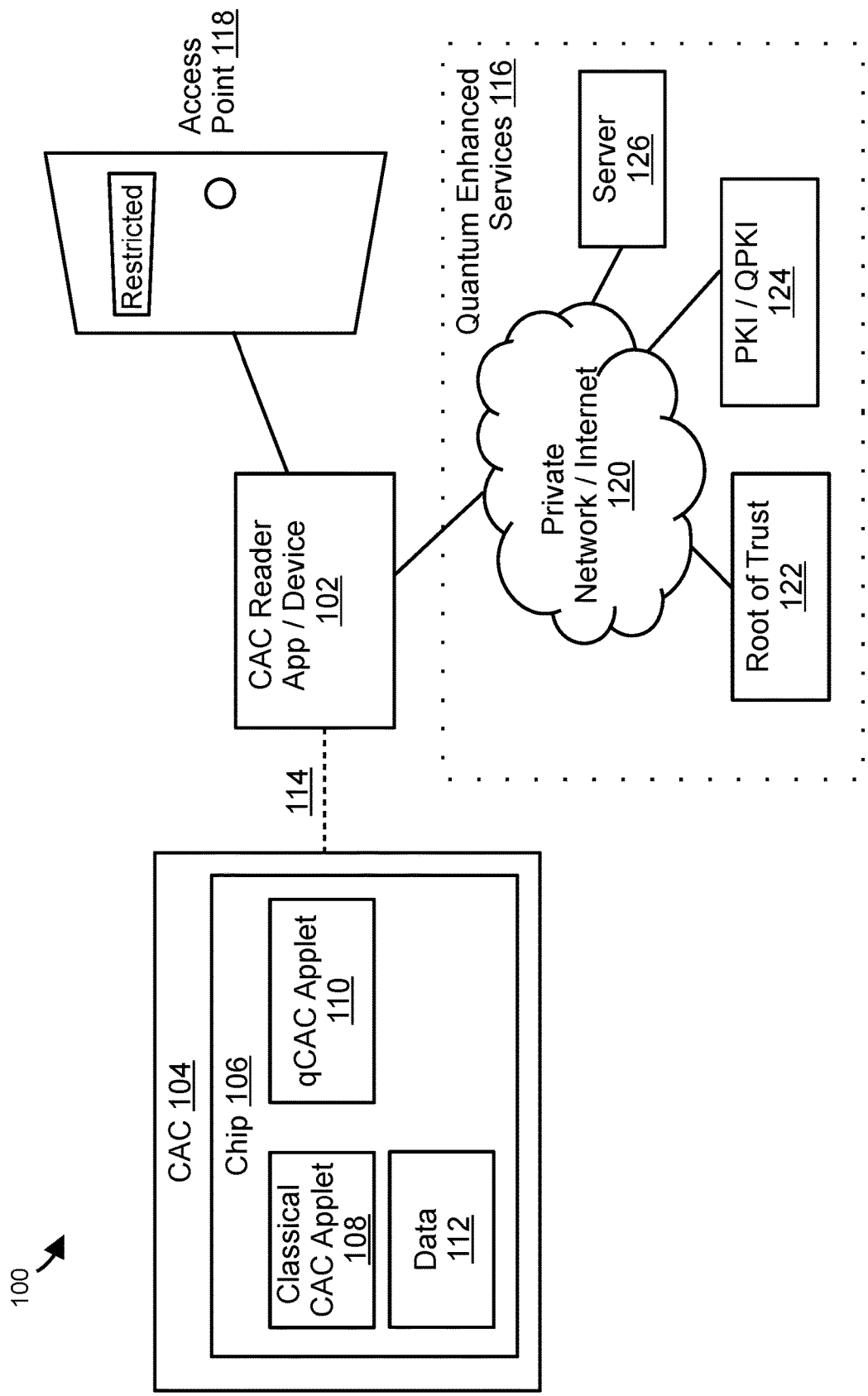
FIG. 1A is a system diagram illustrating a system for validating a Cryptographic Access Card (CAC), according to an embodiment of the present disclosure.

The disclosed system and methods will now be described more fully hereinafter with reference to the accompanying drawings, in which illustrative embodiments of the disclosed system and methods are shown. While various embodiments of the disclosed system and methods are shown and described herein, it will be obvious to those skilled in the art that such embodiments are provided by way of example only. Numerous variations, changes, and substitutions may occur to those skilled in the art without departing from the disclosed system and methods. It should be understood that various alternatives to the embodiments of the disclosed system and methods described herein may be employed.

Unless otherwise defined, all technical terms used herein have the same meaning as commonly understood by one of ordinary skill in the art to which disclosed system and methods belong. As used in this specification and the appended claims, the singular forms "a," "an," and "the" include plural references unless the context clearly dictates otherwise. Any reference to "or" herein is intended to encompass "and/or" unless otherwise stated.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," "less than or equal to," or "at most" precedes the first numerical value in a series of two or more numerical values, the term "no more than," "less than," "less than or equal to," or "at most" applies to each of the numerical values in that series of numerical values. For example, less than or equal to 3, 2, or 1 is equivalent to less than or equal to 3, less than or equal to 2, or less than or equal to 1.

Where values are described as ranges, it will be understood that such disclosure includes the disclosure of all possible sub-ranges within such ranges, as well as specific numerical values that fall within such ranges irrespective of whether a specific numerical value or specific sub-range is expressly stated.

As used herein, like characters refer to like elements.

Quantum computing technology currently under development may pose a threat to existing encryption algorithms, for example quantum computers may soon be able to break classical cryptographic algorithms. In particular, using a quantum computer, an attacker could potentially break into a private network and defeat classical cryptographic protections in order to compromise stored data, such as user data, sensitive data stored in secure computer systems, and the like. Accordingly, improved security systems have been developed, and continue to be developed, that are more resilient to non-classical computers such as quantum computers. For example, the National Institute of Standards and Technology (NIST) post-quantum encryption competition candidate algorithms are resilient against such a quantum computing attack, as described in the example of FIG. 2 below.

It is desirable to be able to protect communication technologies, including existing technologies such as Cryptographic Access Cards (CACs), access fobs or devices, credit cards, or bank cards that may use legacy encryption protocols, using newer security systems that are quantum secure, or secure against attacks using quantum computers. In particular, with the rapid ongoing development of quantum computing technology and quantum algorithms, the possibility of legacy CACs remaining in use, despite relying on completely compromised classical cryptography such as legacy classical cryptosystems, may pose a significant risk. The disclosed system and methods can address these risks by providing quantum secure systems that are able to validate CACs or cryptographic access codes.

Cryptographic Access Cards (also referred to as Common Access Cards or CACs) are widely used in government for identification and/or access control. For example, CAC validation may be required in order to enter or physically access certain restricted buildings, rooms, sites, or controlled spaces, for example by unlocking doors, opening gates, or gaining entry to restricted floors of a building. CAC validation may also be required in order to access some computer networks and systems, for example military computer systems. The CAC also typically contains a photo and/or other identifying information of its user. When using a CAC as a form of identification or to access controlled resources, a user may also be required to enter or provide a personal identification number (PIN) that matches a PIN stored in the CAC, thereby authenticating the user as the legitimate holder of the CAC.

FIG. 1A is a system diagram illustrating a system 100 for validating a Cryptographic Access Card (CAC) 104, according to an embodiment of the present disclosure. A CAC 104 is a card or fob that may contain a programmed chip 106, for example an integrated circuit chip, having various types of computing capabilities. A CAC can contain data 112, usually in the form of X509 digital certificates (version 3 or later) and possibly other digital objects, as well as executable code (termed "applets") 108 and 110 that work together with external hardware, software and data to perform verification and validation using a public key infrastructure (PKI) 124. In particular, the data 112 may include an identification number, such as an Electronic Data Interchange Personal Identifier (EDIPI) number, which can be stored within a PKI certificate. The data 112 may also include a barcode, which can include information such as a barcode version, a checksum, personal information about the cardholder of the CAC 104, expiration and security information about the CAC 104, and the like.

The chip 106 may contain classical applets 108 and/or quantum-aware applets 110 for verification and validation. In some examples, the chip 106 must contain classical applets 108, thereby maintaining interoperability with legacy CAC systems, while the quantum-aware applets 110 may be non-critical extensions, or optional. Alternatively, in other examples, both the classical applets 108 and the quantum-aware applets 110 may be optional. Typically, a fuse may be blown in the CAC's chip 106, so that the card cannot be re-programmed. In particular, while some cards may receive over the air (OTA) updates, such OTA updates may exclusively perform forward increments of the CAC's software (such as applets 108 and 110). For example, a new applet may be added to the CAC, but an old applet may not be deleted or disabled by an OTA update. In some examples, the applets may be implemented via Java Card and/or another smart card technology.

In some examples, the disclosed system and methods can be used to validate and/or verify another type of card or fob, such as a bank card, an automotive fob, a private or non-governmental security system fob, or any other card or fob, and are not limited by the present disclosure. In some such cases, the general architecture of the system 100 may still be applicable. An example of a system implementing the disclosed methods to validate a bank card will be described in greater detail in FIG. 1B below.

The CAC 104 may be read 114, e.g. for verification and/or validation purposes, by a CAC reader app and/or device 102, for example a card reader attached to, associated with, or controlling an access point 118, such as a secured door or gate. For example, if the CAC reader 102 determines that the CAC 104 provides current access permission to the access point 118, it can authorize access, otherwise it can deny access. In some examples, in addition to reading CAC chip 106, the CAC reader 102 may require the user to enter a personal identification number (PIN), so as to authenticate the user as the legitimate holder of the CAC 104.

In some examples, the CAC reader 102 can read 114 chip 106 via a chip reader, for example when the CAC 104 is inserted into the CAC reader 102. For example, the CAC reader 102 may request the user to enter the PIN while the CAC 104 is inserted, and may then authenticate the entered PIN by matching against the PIN stored in chip 106. In some examples, the CAC reader 102 can read 114 the CAC 104 and/or chip 106 via a magnetic strip reader, for example when the CAC 104 is swiped in the CAC reader 102. Alternatively or additionally, the CAC reader 102 may read 114 the CAC 104 and/or chip 106 without making physical contact. For example, the CAC reader 102 can read 114 the CAC 104 and/or chip 106 via a radio-frequency identification (RFID) reader, a near-field communication (NFC) receiver, a contactless payment reader, Bluetooth, wi-fi, or the like. For example, a cardholder may tap, wave, or otherwise present the CAC 104 to the CAC reader 102. In such examples, the CAC reader 102 can read 114 the data 112 stored in CAC 104 and/or the chip 106, and/or can execute or otherwise interact with the applets 108 and 110 via RFID, NFC, Bluetooth, wi-fi, contactless payment, or another technology. The system can then proceed with the verification and validation methods disclosed herein on the basis of having read 114 the CAC 104 via these contactless technologies.

The CAC reader 102 may read 114 some or all of the data 112 in the CAC chip 106, and may connect to a network 120 so as to communicate with a set of quantum enhanced services 116, such as a root of trust 122 and/or a PKI or quantum PKI (QPKI) 124, while validating the CAC 104, as described herein below. For example, the network 120 can include a high-security private network such as the US governmental network, the Non-classified Internet Protocol Router Network (NIPRNet). Alternatively, the network 120 may include another network, such as a public network and/or the Internet, for example in the case of a bank card, credit card, debit card, or fob.

In some examples, CAC reader 102 may actively combine data 112 from the CAC chip 106 with data received via the network 120, for example by a computation performed by one or more applets, such as the applets 108 and 110. Alternatively or additionally, the CAC reader 102 may read 114 the EDIPI number from the PKI certificate on CAC 104 where it is stored, for example an ID certificate, and send the EDIPI number to a processing system, for example PKI/QPKI 124 or another server 126 within the quantum enhanced services 116, and/or any other processing system via the network 120. The processing system can then match the EDIPI number using an access control system, such as Active Directory, another directory service, Lightweight Directory Access Protocol (LDAP), another directory information services application protocol, or the like.

Connecting to the network 120 can provide centralized control over the information, for example enabling a centralized server or database to add, modify, or revoke access of card 104, as well as providing local sites with access to a centralized store of information. For example, if government personnel travel to different access points 118 than their usual sites or workplaces, local card readers in those new locations can validate the personnel's authorization to access restricted sites via the network 120. In addition, communicating via the network 120 allows the system 100 to access and utilize the quantum enhanced services 116, such as a standard PKI and/or QPKI 124. In some cases, in order to provide a high level of security, the network 120 may operate with low trust, for example requiring redundant security measures such as matching CACs and badges, requiring the user to enter a PIN, and the like.

While the card reader 102 may be a networked device or application, the system may perform protocol validation only at layer 1, i.e. the physical layer. Thus, the objective of CAC validation can be understood as ensuring that the CAC 104 has the correct electromagnetic signals encoded on the chip 106 required to authorize access to a restricted resource, such as the access point 118. Like an ATM, the card reader 102 may have a repository containing higher level algorithms that are executed after basic layer 1 compatibility is verified.

Publicly available sources indicate that CACs in current deployment are secured exclusively by classical cryptographic algorithms, such as the Rivest Shamir Adleman (RSA) cryptosystem. With the rapid ongoing development of quantum computing technology, the possibility of CACs in use relying on such insecure, potentially broken classical cryptographic algorithms may be a significant risk. In particular, using a quantum computer, an attacker could potentially breach the network 120 and defeat classical cryptographic protections in order to compromise data stored in the network 120, for example sensitive data relating to the restricted access point 118.

The disclosed system and methods can address the risk of a quantum computing attack by providing CAC verification with post-quantum cryptography, while also providing interoperability with existing CAC hardware and techniques. In particular, the disclosed system can use post-quantum cryptographic algorithms, such as algorithms 200 of the example of FIG. 2 below, to secure the sensitive data against such a quantum computing attack. In various examples, the disclosed system and methods can also be used to secure bank or credit cards, as will be described in greater detail in the example of FIG. 1B, as well as automotive fobs, private security system fobs, or any other secure cards or fobs.

Figure 1B:
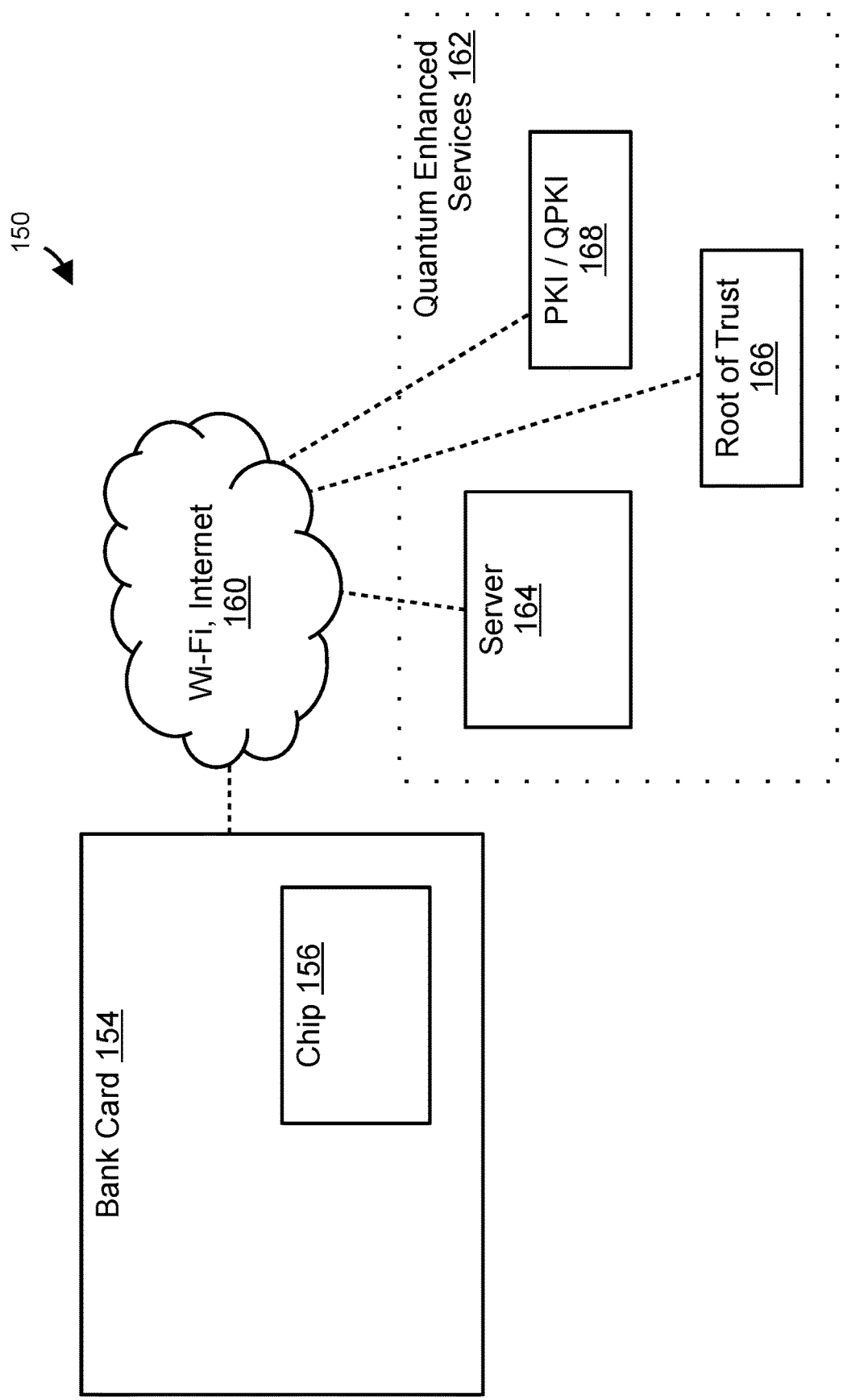
FIG. 1B is a system diagram illustrating a system for validating a bank card, according to an embodiment of the present disclosure.

FIG. 1B is a system diagram illustrating a system 150 for validating a bank, credit, or payment card 154, according to an embodiment of the present disclosure. In some examples, payment card 154 may include an integrated circuit (IC) chip 156, while in other examples, it may not.

Payment card 154 may be validated via a validation method or device 160, such as a card reader, a chip reader for IC chip 156, a magnetic strip reader, a radio-frequency identification (RFID) reader, a near-field communication (NFC) receiver, a contactless payment reader, Bluetooth, wi-fi, or the Internet. For example, payment card 154 may be presented for payment in person at a merchant or point of sale, for example by inserting card 154 and/or chip 156 into a chip reader, swiping a magnetic strip of card 154 in a card reader, waving or tapping card 154 and/or a fob near a contactless payment reader, and the like. Alternatively, payment card 154 may be used for remote payment, for example by entering credentials such as a card number, PIN, card security code (CSC), expiration date, cardholder name, cardholder address, and the like via a website, an app, or over the telephone. Such validation methods 160 may communicate with a set of quantum enhanced services 162, such as a root of trust 166, a PKI and/or QPKI 168, etc., during the process of validating the payment card 154, and/or related processes. In some examples, chip 156 may include applets, such as classical and/or quantum applets for verification and/or validation. In some examples, chip 156 may include data, such as a cryptographic access code and/or other data related to verification and validation.

In an example, such data stored in chip 156 or otherwise associated with payment card 154 may be read or authenticated by a server 164, and/or by an application executing thereon. The server 164 may be located remotely, for example at a data center, bank, or credit authorization facility, and may be accessible via the Internet, a wide-area network, a cellular network, or any other network. In some examples, the server 164 may communicate with the payment card 154, the merchant, and/or a terminal at the point of sale via the various validation methods 160, such as wi-fi, the Internet, and the like. Various quantum enhanced services 162 can also communicate via the various validation methods 160, for example a root of trust 166, a PKI and/or QPKI 168, and the like. In some examples, the server 164 and/or any other local or remote components, such as the validation methods 160, may implement the disclosed techniques for quantum-secure and/or extended classical verification of a cryptographic access code associated with the payment card 154 and/or the IC chip 156. In some examples, the disclosed system and methods can provide quantum secure verification for a bank, credit, or payment card 154 using post-quantum cryptography, while also providing interoperability with existing payment hardware and techniques.

The present disclosure provides a system and method for verifying a cryptographic access code, such as on CAC 104, payment card 154, and/or another card, fob, or device. If all the cryptographic access components are quantum-aware (such as applets of the card or fob itself, the card reader, etc.), the CAC or other card or fob can provide a post-quantum encryption and/or decryption algorithm within a context-specific non-critical extension in a private Object Identifier (OM) namespace. The OID namespace may be stored in the card or fob, for example in the IC chip of a CAC or other card. In various examples, the post-quantum encryption and/or decryption algorithm may include SABER of the Computer Security and Industrial Cryptography (CO SIC) research group at KU Leuven, Belgium; Kyber of the Cryptographic Suite for Algebraic Lattices (CRYSTAL); Enhanced McEliece; or Random Linear Code Encryption Scheme (RLCE).

Likewise, if the cryptographic access components are quantum-aware, the CAC or other card or fob can also specify a post-quantum signature and/or verification algorithm within the private OID namespace. The set of all four algorithms, i.e. the post-quantum encryption and decryption algorithms as well as the post-quantum signature and verification algorithms, may be referred to collectively as an algorithm suite.

In some examples, the post-quantum encryption and/or decryption algorithms may be specified independently from the post-quantum signature and/or verification algorithms, for example within a separate OID namespace. In some examples, the post-quantum encryption and/or decryption algorithms may differ from the post-quantum signature and/or verification algorithms. In some examples, all four of these algorithms may be specified independently and/or may differ from each other, and are not limited by the present disclosure.

In some embodiments, the post-quantum signature or verification algorithm may be specified in a second private OD namespace, and is not limited by the present disclosure.

Figure 2:
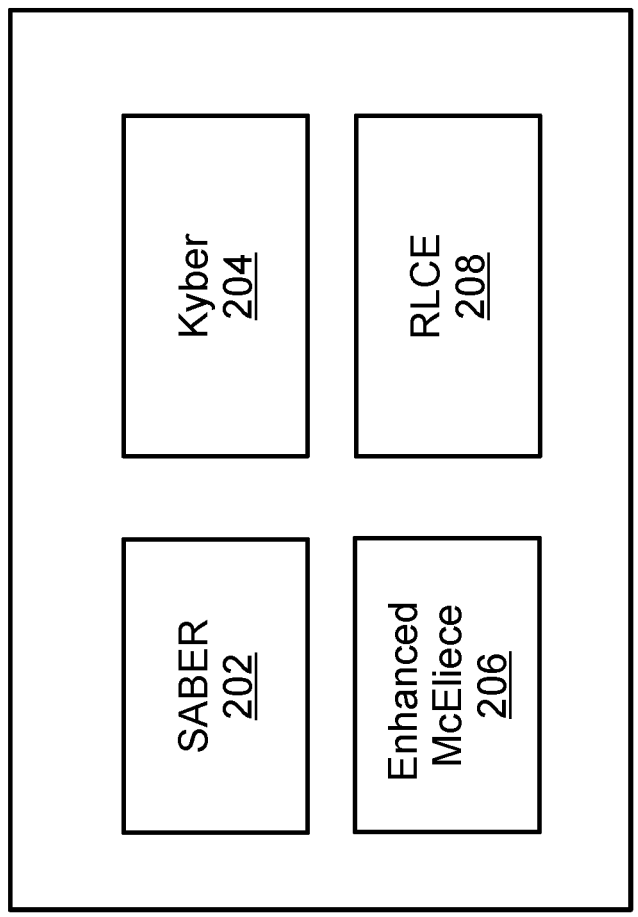
FIG. 2 is a block diagram illustrating post-quantum encryption and decryption algorithms, according to an embodiment of the present disclosure.

FIG. 2 is a block diagram illustrating post-quantum algorithms 200, according to an embodiment of the present disclosure. The set of all four of the algorithms specified in operations 454 and 456 of the example of FIG. 4B (i.e., the post-quantum encryption, decryption, signature, and/or verification algorithms) may be referred to collectively as an algorithm suite. In some embodiments, the individual algorithms of the algorithm suite may be selected from the post-quantum algorithms 200. For example, the algorithms of the algorithm suite can include any combination of the National Institute of Standards and Technology (NIST) post-quantum encryption competition candidate algorithms, such as SABER 202, Kyber 204, Enhanced McEliece 206, and Random Linear Code Encryption Scheme (RLCE) 208. These algorithms 200 have been found to be resilient against quantum computing attacks. Alternatively, the disclosed system, card readers, and/or cards may use, specify, and/or read other algorithms, and is not limited by the present disclosure.

In some examples, the algorithm may be specified within a context-specific non-critical extension in a private OD namespace by a stored value or code that specifies which of the algorithms 200 should be used. In some examples, the system may use multiple private OID namespaces. For example, the post-quantum encryption and/or decryption algorithms can be specified within a separate OID namespace from the post-quantum signature and/or verification algorithms. In another example, the context-specific non-critical extension and/or the private OID namespace can specify more than one algorithm. For example, the system may use multiple algorithms to encrypt and/or decrypt CAC data. In another example, the system may use more than one algorithm as alternatives, for example encoding multiple copies of the data using different algorithms.

As described above and in greater detail below, if all the relevant cryptographic access components are quantum-aware, the disclosed system can obtain a post-quantum encryption and/or decryption algorithm as well as a post-quantum signature or verification algorithm from the private OID namespace. Then, irrespective of whether the cryptographic access components are quantum-aware, the disclosed system can specify a root of trust in a TAL record; confirm that a respective certificate, Certificate Revocation List (CRL), or TAL is specified in at least one Manifest record; match a hash of the respective certificate, CRL, or TAL to a recorded hash in a respective Manifest listing the respective certificate, CRL, or TAL; and confirm that a respective CRL or Manifest is fresh. These operations will be described in greater detail below.

The disclosed post-quantum CAC (also referred to herein as pqCAC or qCAC) system and methods provide numerous advantages over other systems. First, the disclosed pqCAC systems and methods enable the use of post-quantum cryptography (pq-cryptography) in a new generation of CACs. For example, the system can provide supplemental quantum-level encryption, such as on a CAC card or bank card. For example, the supplemental quantum-level encryption may use at least one of the NIST post-quantum encryption competition candidate algorithms, such as SABER, Kyber, Enhanced McEliece, or RLCE. Such quantum-level encryption can bring CAC cards, bank cards, and/or other technologies to a level of quantum security, that is, a level of resilience or security against post-quantum attacks.

In addition, the disclosed system can provide the advantage of interoperability, such as providing backward compatibility with classical or legacy encryption methods. For example, a device configured to read a CAC or other card using the disclosed methods, such as the CAC reader 102 of FIG. 1A, can determine whether the CAC 104 or other card is quantum-aware, for example by determining whether one or more private OID namespaces of the card's chip 106 contain non-critical extensions with quantum applets 110. If any particular component involved in verification (such as a card reader, applets installed on a legacy card, or any other component) is not quantum-aware, the disclosed system and methods may implement an interoperable method, such as classical RSA or another quantum-unaware method. In particular, if a quantum-aware component is used together with a quantum-unaware component, verification can still proceed classically. If all components are quantum-aware, then the disclosed system can use pq-verification. In one possible example, a classical applet may ignore any quantum-specific non-critical extensions that may be present in a private OID namespace of chip 106, whereas a quantum applet may make use of such extensions. Thus, the disclosed pqCAC is a backward compatible upgrade of a CAC, allowing deployment of the disclosed system and methods to proceed incrementally rather than abruptly.

Figure 3:
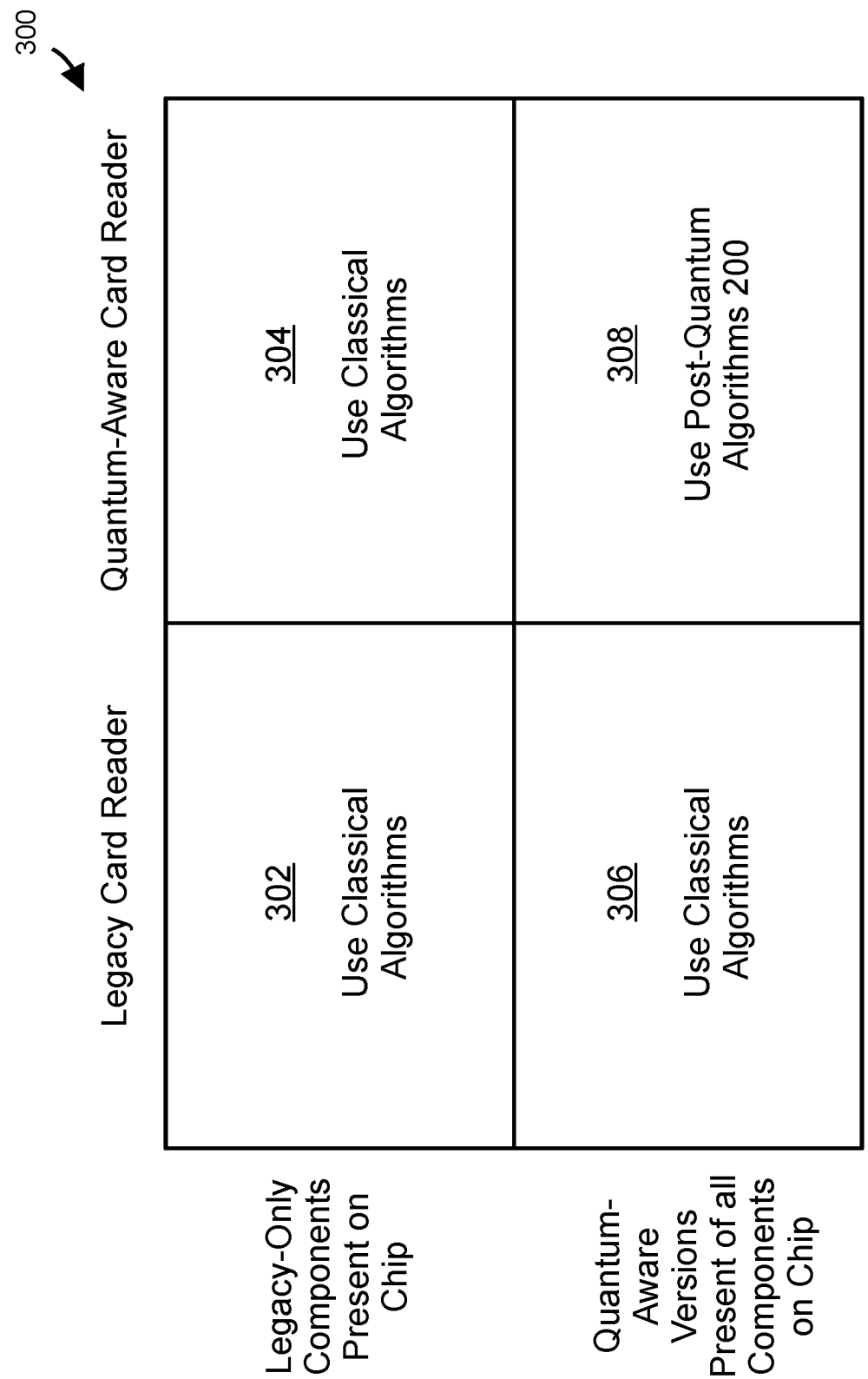
FIG. 3 is a block diagram illustrating a backward-compatible algorithm selection template for encryption, decryption, signature, and/or verification algorithms.

FIG. 3 is a block diagram illustrating a backward-compatible algorithm selection template 300 for encryption, decryption, signature, and/or verification algorithms. The selection template 300 may provide an example of how the disclosed system can determine which algorithms to use for encryption, decryption, signature, and/or verification in a particular case. For example, the particular case may involve specific hardware (e.g., a particular card reader) and particular data and/or applets (e.g., data and/or applets present on the chip of a particular CAC or other fob or device). In some examples, the system may make determinations other than the ones illustrated in selection template 300, and is not limited by the present disclosure.

In the example of FIG. 3, the type of encryption, decryption, signature, and/or verification algorithms selected and/or utilized by the system (for example, a card reader such as CAC reader 102 of the example of FIG. 1A and/or the validation method or device 160 of the example of FIG. 1B) as an algorithm suite for use with the disclosed methods can depend on whether all components are quantum aware. In particular, the algorithms selected can depend on the card reader as well as on the components (such as applets and/or data) on the chip of a particular CAC, bank card, or other card, fob, or device.

For example, in a case 302 with a legacy card reader and some legacy-only components present on the chip of the CAC or other device, the system may select and/or utilize classical algorithms for encryption, decryption, signature, and/or verification. That is, in the case 302, even if there are some quantum-aware components on the chip of the CAC or other device, there may be some components on the chip with no quantum-aware version. Such components will be referred to as legacy-only components.

For example, suppose a CAC includes five applets with quantum-aware versions, but also includes a sixth applet that has no quantum-aware version. Then the quantum-unaware sixth applet is referred to as a legacy-only applet. In this example, the CAC has a legacy-only applet, and therefore the case 302 applies, and the system can select classical algorithms.

In some examples, if the legacy-only applet is not needed for a given verification operation, the system may continue to perform post-quantum verification during that particular verification operation, and is not limited by the present disclosure.

In a variation of the above example, if the same CAC eventually receives a quantum-aware version of the sixth applet (for example, via an OTA update), then eventually all six applets present on the CAC may have quantum-aware versions. In such an example, the applicable situation would change to the case 308 with a quantum-aware card reader and quantum-aware components, and the system could therefore select post-quantum algorithms, as described below.

Next, consider a case 304 where the card reader is the disclosed quantum-aware card reader, but there are still only legacy components present on the chip of the CAC or other device. In such a case 304, the system (e.g., the quantum-aware card reader) may still select and/or utilize classical algorithms for encryption, decryption, signature, and/or verification. For example, even if there are some quantum-aware components on the chip, there may be some components without a quantum-aware version, which will be referred to as legacy-only components. In case 304, the disclosed quantum-aware card reader can select classical algorithms so as to interoperate with these legacy-only components. Accordingly, case 304 of the selection template 300 can provide backward compatibility.

Next, consider a case 306 with a legacy card reader and quantum-aware components (for example, post-quantum applets as disclosed herein) present on the chip of the CAC or other device. In such a case 306, the system may select classical algorithms for encryption, decryption, signature, and/or verification. Similarly to the case 304 described above, in case 306, the disclosed quantum-aware CAC or other device can select classical algorithms. Accordingly, case 306 of the algorithm selection template 300 can provide backward compatibility with the legacy card reader.

By contrast, in a case 308 with the disclosed quantum-aware card reader and quantum-aware components on the chip of the CAC or other device as disclosed herein, the system may select and/or utilize post-quantum algorithms for encryption, decryption, signature, and/or verification. For example, the system may select any combination of the post-quantum algorithms 200 of the example of FIG. 2 above for the algorithm suite.

Note that the US government has issued millions of active CACs, which may be read by at least one million existing CAC readers to provide access to a vast number of sites, computer systems, equipment, and other resources. Accordingly, the backward-compatibility 300 of the disclosed system and methods is highly advantageous, enabling the existing CAC infrastructure to be upgraded to quantum-secure technology in a phased fashion, without invalidating the existing infrastructure. This can reduce the cost, difficulty, complexity, and risk of error of this crucial upgrade.

Finally, another advantage is that the disclosed system can provide extended PKI and/or quantum PKI (QPKI) validation, which can provide a stronger implementation of encryption than other methods. In particular, extended PKI/QPKI validation can provide a stronger implementation of encryption even if used with an interoperable method such as classical RSA. Thus, extended validation can provide strong authentication for either quantum-aware or legacy encryption methods, that is, for any level of available encryption technology.

Aspects of the disclosed verification methods that are applicable to both legacy CACs and pqCACs will be described in the example of FIG. 4A. Extended verification that can be performed by a quantum applet and an extended superset of the classical PKI will then be described in the example of FIG. 4B below. This superset of classical PKI will be referred to as the quantum PKI (QPKI). Note that, in an example initial deployment of the disclosed system, a pqCAC must have a classical applet and also a quantum applet. Alternatively, in other examples, a pqCAC may have another combination of classical and quantum applets, and is not limited by the present disclosure.

Figure 4A:
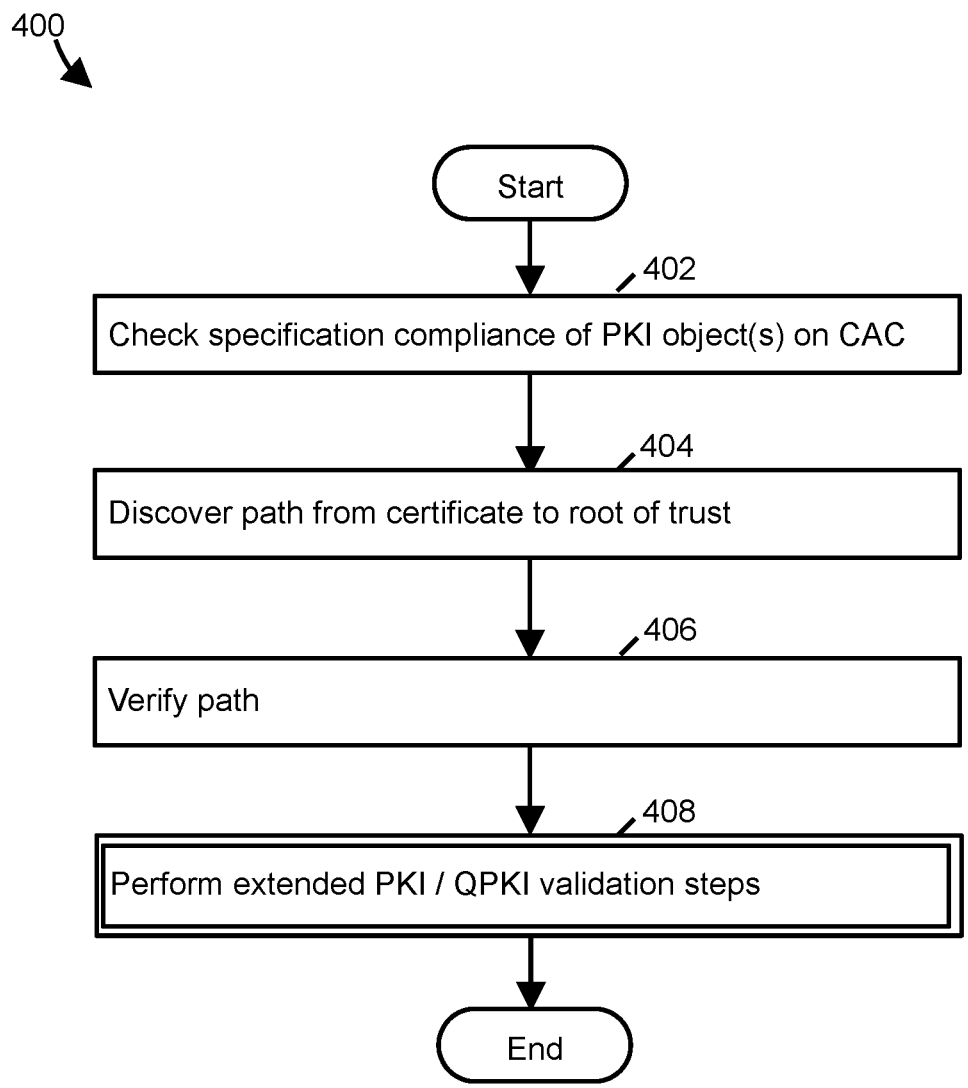
FIG. 4A is a flow diagram illustrating a method of verifying a cryptographic access code, according to an embodiment of the present disclosure.

FIG. 4A is a flow diagram illustrating a method 400 of verifying a cryptographic access code, according to an embodiment of the present disclosure. In some examples, the method 400 may provide context of the extended verification method 450 described in the example of FIG. 4B below. In an example, the method 400 may be implemented by a CAC reader, such as the CAC reader 102 of FIG. 1A above, and/or by a system for validating a CAC, such as the system 100 of FIG. 1A above. Alternatively, in various embodiments, the method 400 may be implemented by any other device, and is not limited by the present disclosure.

In this example, the method 400 can start with the system (e.g., a card reader) checking 402 specification compliance of one or more PKI objects that reside on a CAC. All digital objects in the PKI and QPKI may be governed by published specifications (such as the X509 certificate specification) that should be obeyed. The syntactic content of the specification can be described using Abstract Syntax Notation v1 (ASN.1) and Distinguished Encoding Rules (DER). In some cases, semantic rules may narrow what is acceptable in practice. For example, an X509 certificate should have a "version" field encoded as binary 0, 1, or 2, which can correspond to versions 1, 2, and 3, respectively. In order to be currently valid, an X509 certificate should be version 3, thereby providing a semantic constraint. Moreover, mandatory fields should be present and should pass all syntactic and semantic checks.

In some embodiments, digital objects can contain context-specific, or optional, fields of two types: critical and non-critical. In some embodiments, if a critical extension is present, then it must be validated, whereas validation and interpretation of non-critical extensions can be dependent on the context, such as the applet. The presence of non-critical extensions may mean that a classical or a quantum applet use the same certificate in different ways. For example, the classical applet can ignore the quantum-specific non-critical extensions, whereas the quantum applet can make use of them. In another example, a quantum applet may use a certificate to perform quantum-aware validation according to non-critical extensions, whereas a classical applet may use the same certificate to perform non-quantum extended validation according to other critical and/or non-critical extensions.

Extensions can be described by field names in the ASN.1 encoding, and also by Object Identifiers (OIDs), such as persistent identifiers conforming to a standardized OID convention. These OIDs can form a hierarchical numerical namespace, which can form an ontology managed by standards bodies (such as the Internet Assigned Numbers Authority (IANA) and the Internet Engineering Task Force (IETF), in a typical example). The OID namespace can contain reserved portions, which may be used in a context-specific manner and/or in a vendor-specific manner.

Next, the system (e.g., a card reader) can discover 404 a path from a certificate to a root of trust. Path discovery may be the process of discovering a chain of (child, parent) object relationships between an object (e.g., a certificate) on the CAC and an ultimate root of trust, which may also be referred to as a trust anchor. A root of trust can have at least one of the following three properties: (1) it can be a member of a "Root" certificate store managed by the local cryptographic API (CAPI); (2) it can be mentioned in a TAL record by unique URL, URI, or URN (which may be referred to collectively herein as simply a "URL"); or (3) it can be self-signed. Note that the root of trust specification does not necessarily require that a root be self-signed, but many cryptographic libraries may nevertheless enforce this as a requirement.

A child object can discover its parent object using a search algorithm. A search algorithm, in turn, can be a pattern matching algorithm between one or more fields of the child object and one or more fields of the parent object. In some examples, two forms of search may be typical: (1) the issuer field of the child may match part or all of the name of the parent; and (2) the authority key identifier (aki) of the child may exactly match the subject key identifier (ski) of the parent. In some cases, organizations may replace text strings with fixed but arbitrary random strings, according to the organizations' privacy policy. Preferably, such a replacement should not disrupt the pattern matching algorithm, however in some practical examples, disruptions may result. In some embodiments, the QPKI method may preferably implement the second form of search, that is, an exact match of the child's aki to the parent's ski. However, conforming implementations should support any pattern-matching algorithms that are provided in the specification.

Standard path discovery should meet the following conditions. First, every child should have exactly one parent. Next, the path chain should contain at least two elements, and at most six elements. In addition, the path should be loop-free, except that the root of trust may be its own parent. No certificate in the path should be expired. Finally, no certificate in the path should be revoked.

Expired certificates may be detected in two ways. A typical or standard method is to compare the expiration date field in the certificate with the local time of a machine that hosts that certificate. If the expiration date is in the past, the system can determine that the certificate is expired. A second method is for the hosting organization to delete any expired certificates, causing path discovery to fail. This approach may not be fully standards-compliant, but is nevertheless used fairly frequently.

In various examples, revoked certificates may be detected in any of three ways. For example, some implementations use CRLs to denote revoked certificates. If a CRL exists that has the same issuer as a certificate (which may also be referred to as the CRL being a sibling of the certificate), and if the sibling CRL's data includes the unique serial number of the certificate, then the system can determine that the certificate is revoked. Alternatively, some implementations use an Online Certificate Status Protocol (OCSP) server. This is a service in which a certificate is submitted to the OCSP server, and the OCSP server can then return a status code indicating whether the certificate is valid. While OCSP may typically be used to detect a certificate's revocation status, in some examples it can also be used to detect the certificate's expiration status. In addition, some implementations may use CRLs and OC SP in parallel. In some examples, using both CRLs and OCSP in parallel may be permissible, for example it may not trigger an error. In the QPKI, the use of CRLs may be preferred, as CRLs are less subject to network attacks than OCSP. A conforming implementation should check both CRLs and OCSP, and should make a conservative determination (that is, determine that the certificate is revoked) if these two methods disagree. Finally, in some examples, the system may delete revoked certificates, which can cause path discovery to fail.

Next, the system can verify 406 the discovered path. Whereas path discovery 404 should proceed upward (i.e., from a PKI object on the CAC to the trust anchor), path validation must proceed downward from the trust anchor. Each parent object can contain a key or key fragment, which can be used to verify the signature and/or hash-based message authentication code (HMAC) of its child object. Note that failure to verify the signature and/or HMAC of the child must be a fatal error.

In some examples, the system verifies 406 the path computationally. For example, in some embodiments, path validation must be an active computational process. Note that post-quantum algorithms, such as the post-quantum algorithms 200 of FIG. 2, may feature non-deterministic encryption and/or signing. Therefore, in some examples, the system may require more complex and/or sophisticated signature verification capabilities than a straightforward binary comparison of the actual to an expected signature. Still, the system should be able to perform decryption and signature verification deterministically for any algorithm, whether a post-quantum or legacy algorithm.

Next, the system (e.g., a card reader) can perform 408 steps for extended PKI and/or QPKI validation. Performing 408 extended PKI and/or QPKI validation is described in greater detail in method 408 in the example of FIG. 4B below.

Figure 4B:
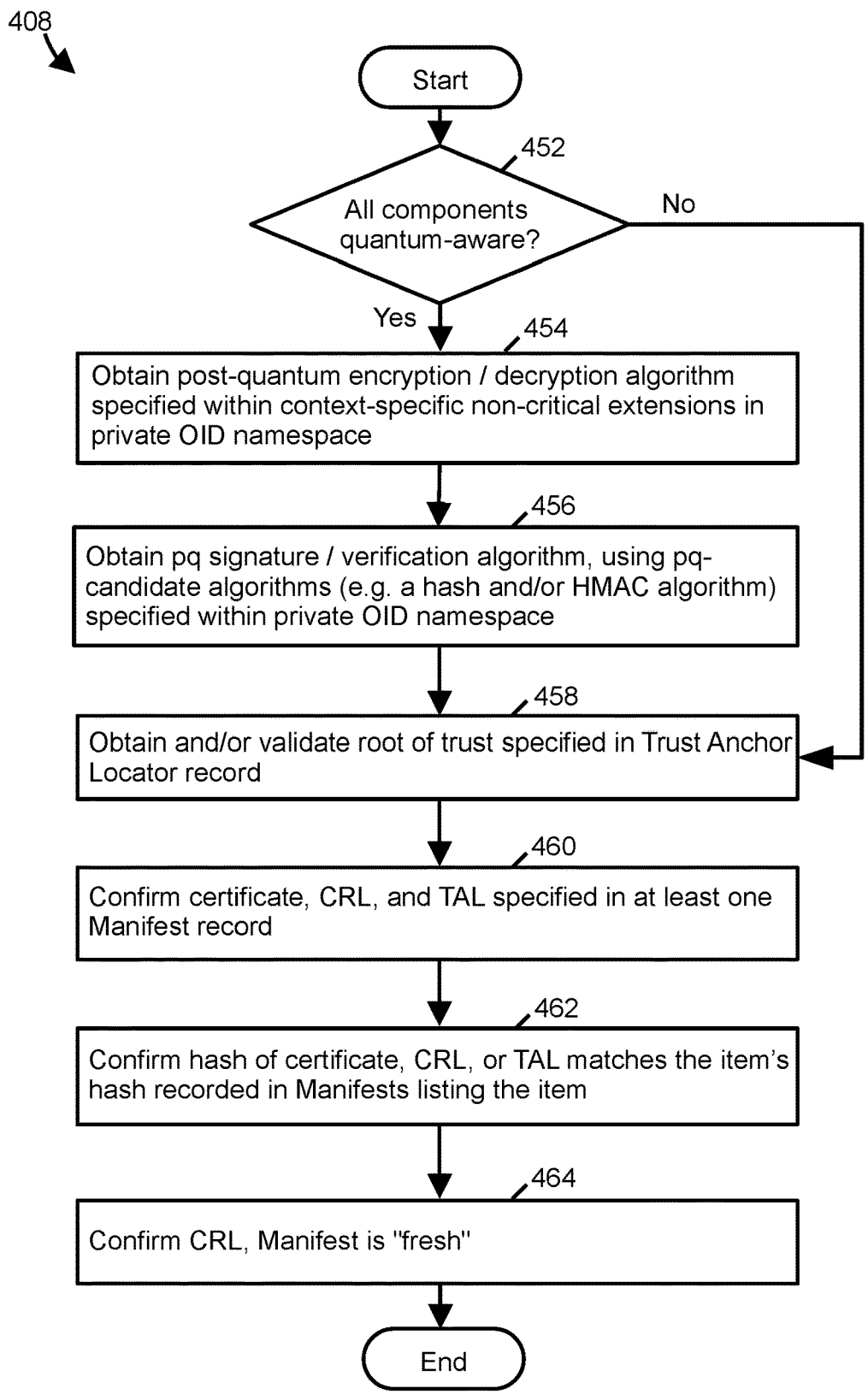
FIG. 4B is a flow diagram illustrating an extended validation method of verifying a cryptographic access code, according to an embodiment of the present disclosure.

FIG. 4B is a flow diagram illustrating an extended validation method 408 of verifying a cryptographic access code, according to an embodiment of the present disclosure. In some examples, the method 408 may provide additional details of operation 408 of method 400 in the example of FIG. 4A above. For example, the extended validation method 408 may be included as extra operations of the method 400 of FIG. 4A above for verifying a cryptographic access code. Moreover, the QPKI can support extended verification using quantum applets (such as pqCAC applet 110 of FIG. 1A), and accordingly the quantum-aware extended verification operations 454 and 456 may be included as additional quantum-aware steps of the extended validation method 408, as described below. In some examples, the method 408 may be implemented by a CAC reader and/or by a system for validating a CAC, such as system 100 in the example of FIG. 1A above. Alternatively, in various embodiments, the method 408 may be implemented by any other device, and is not limited by the present disclosure.

In this example, the method 408 can start with the CAC reader and/or system determining 452 whether all components are quantum-aware. In some examples, the system or a component thereof (e.g., a quantum-aware CAC reader) may query other components (e.g., a CAC, and/or all the applets hosted by the CAC) to determine whether they are quantum-aware, or the quantum-aware components may send a signal identifying themselves as quantum-aware.

Next, responsive to the system determining 452 that all components are quantum-aware, the system can continue to operations 454 and 456. Alternatively, if not all components are quantum-aware, the system may continue directly to extended classical PKI validation in operation 458.

In operation 454, responsive to all components being quantum-aware, the system can read at least one post-quantum encryption and/or decryption algorithm, which may be specified within context-specific non-critical extensions in a private OID namespace. For example, the algorithm may be specified within non-critical extensions in PKI objects stored as data on the CAC, or within the PKI and/or QPKI, as in the example of FIG. 1A above. In some embodiments, the post-quantum encryption and/or decryption algorithm may be one of the National Institute of Standards and Technology's (NIST) pq encryption competition candidate algorithms. For example, the post-quantum encryption and/or decryption algorithm may comprise at least one of: SABER; Kyber; Enhanced McEliece; or Random Linear Code Encryption Scheme (RLCE). In an embodiment, the post-quantum encryption and/or decryption algorithm may be specified within the private OID namespace by a stored value or code that specifies which of these algorithms should be used. The system can use the specified post-quantum encryption and/or decryption algorithm while validating the CAC, e.g. when encrypting and/or decrypting the data stored on the CAC. In some examples, the context-specific non-critical extension and/or the private OID namespace can specify more than one algorithm.

In operation 456, responsive to all components being quantum-aware, within the private OID namespace, the system can read a post-quantum (pq) signature and/or verification algorithm, for example a hash and/or HMAC algorithm. The pq-signature and/or verification algorithm may be specified within the private OID namespace. For example, the algorithm may be specified within non-critical extensions in PKI objects stored as data on the CAC, or within the PKI and/or QPKI, as in the example of FIG. 1A above. In some embodiments, the post-quantum signature and/or verification algorithm may be one of the NIST pq-candidate algorithms, such as: SABER; Kyber; Enhanced McEliece; or RLCE. In an embodiment, the pq signature and/or verification algorithm may be specified within the private OID namespace by a stored value or code that specifies which of these algorithms should be used.

In some examples, the post-quantum encryption and/or decryption algorithms may be specified 454 independently from the post-quantum signature and/or verification algorithms 456, for example within a separate OID namespace. In some examples, the post-quantum encryption and/or decryption algorithms may differ from the post-quantum signature and/or verification algorithms. In some examples, all four of these algorithms may be specified independently and/or may differ from each other, and are not limited by the present disclosure. The set of all four algorithms, i.e. the post-quantum encryption and decryption algorithms as well as the post-quantum signature and verification algorithms, may be referred to as an algorithm suite.

In some examples, the specified signature and/or verification algorithm may be a hash and/or HMAC algorithm. In particular, the HMAC may be construed as a generalized form of signature. The system can use the specified post-quantum algorithm suite while validating the CAC, e.g. when signing and/or verifying the data stored on the CAC.

Next, the system can proceed to the steps 458-464 of extended PKI validation. The steps 458-464 which can be performed regardless of whether all components are quantum-aware. For example, in operation 452, if the system determines that all components are quantum-aware (such as in case 308 of the example of FIG. 3), the system may perform steps 454-456 as described above, and may then continue to steps 458-464.

Alternatively, in operation 452, if not all components are quantum-aware (as in, for example, cases 302, 304, and/or 306 of FIG. 3), the system may proceed directly to operations 458-464, as described below. As a result, even in cases where some components are quantum-unaware, and/or even in cases where the methods 400 and 408 are used with one or more legacy cryptographic algorithms, the following operations 458-464 can still result in an especially strong, secure implementation of encryption, which may be more secure than other comparable methods. Accordingly, the disclosed extended validation method 408 can provide exceptionally robust security, in either case of decision 452.

Moreover, note that the disclosed extended validation method 408 is computationally tractable. In particular, while in some examples, the operations 458-464 may be more computationally demanding than a weaker implementation (e.g., including more operations than the weaker method), this extra computational demand is modest. Accordingly, a user is unlikely to perceive any meaningful qualitative difference in the methods' response time or latency. For example, a computing time of approximately 5 seconds to implement a weaker method may be compared with approximately 7 seconds in the disclosed highly secure method 408 and/or operations 458-464, even on identical currently-available computing hardware. The added security of method 408 and/or operations 458-464 is well worth this modest computational burden.

Next, the system can obtain 458 a root of trust, for example by reading it from a Trust Anchor Locator (TAL) record. In some embodiments of extended PKI validation, the root of trust must be specified in a TAL record. Accordingly, in some embodiments, the system can validate 458 the root of trust, for example by confirming that a valid root of trust is specified in a TAL record.

Next, the system can obtain 460 all needed certificates, CRLs, and TALs, for example by reading them from the PKI and/or QPKI repositories and reading their hash values in one or more Manifest records. In some embodiments of extended PKI validation, every certificate, CRL, and TAL should be specified in at least one Manifest record (but the Manifest must not list itself). Accordingly, in some embodiments, the system confirms that each certificate, CRL, and TAL is specified in a valid Manifest record.

Next, the system can confirm 462 that the hash of any certificate, CRL, or TAL matches the corresponding hash recorded in all Manifests that list the certificate, CRL, or TAL. In some embodiments of extended PKI validation, the hash of any certificate, CRL, or TAL should match the item's hash recorded in all Manifests that list it.

Next, the system can confirm 464 that every CRL and Manifest is "fresh," that is, that every CRL and Manifest has a future date and/or time value in its updateBy field. In some embodiments of extended PKI validation, every CRL should be "fresh," i.e., the updateBy field in the CRL should be in the future. Likewise, every Manifest should be "fresh," i.e., the updateBy field in the Manifest should be in the future. Note that an object that is not fresh may be referred to as "stale." In some embodiments, stale objects should not be used in extended verification.

The method 408 can then end.

Figure 5:
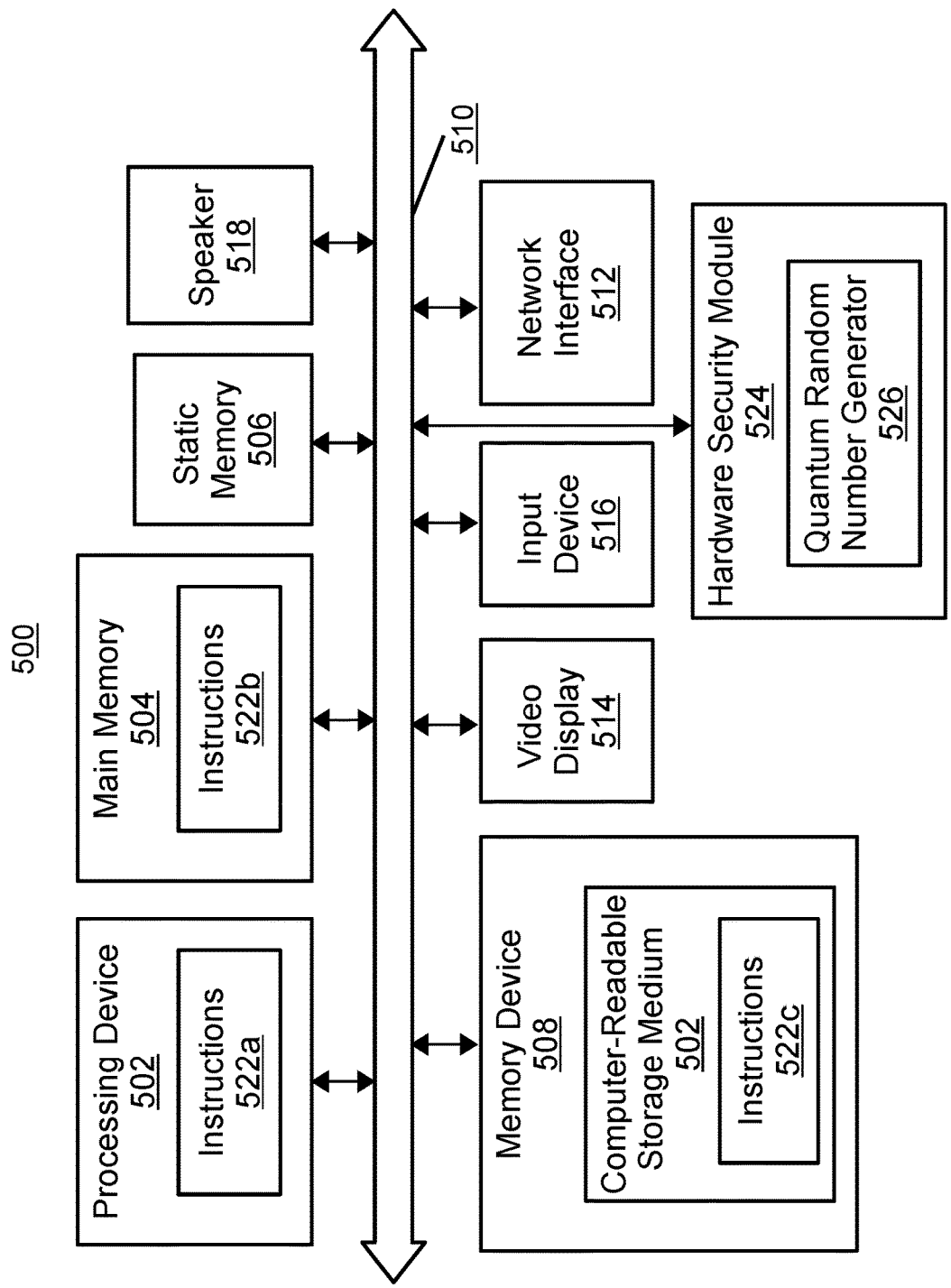
FIG. 5 is a block diagram of an example computer system which can perform any one or more of the methods described herein, in accordance with one or more aspects of the present disclosure.

FIG. 5 is a block diagram of an example computer system 500 which can perform any one or more of the methods described herein, in accordance with one or more aspects of the present disclosure. In one example, the computer system 500 may include a computing device and correspond to one or more of the CAC reader 102, the root of trust 122, the PKI/QPKI 124, the server 164, or any suitable component of FIGS. 1A-1B. The computer system 500 may be connected (e.g., networked) to other computer systems in a local area network (LAN), an intranet, an extranet, or the Internet, including via the cloud or a peer-to-peer network. The computer system 500 may operate in the capacity of a server in a client-server network environment. The computer system 500 may be a personal computer (PC), a tablet computer, a wearable (e.g., wristband), a set-top box (STB), a personal Digital Assistant (PDA), a mobile phone, a smartphone, a camera, a video camera, an Internet of Things (IoT) device, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The computer system 500 (one example of a "computing device") illustrated in FIG. 5 includes a processing device 502, a main memory 504 (e.g., read-only memory (ROM), flash memory, solid state drives (SSDs), dynamic random-access memory (DRAM) such as synchronous DRAM (SDRAM)), a static memory 506 (e.g., flash memory, solid state drives (SSDs), or static random-access memory (SRAM)), and a memory device 508, wherein any of the foregoing may communicate with each other via a bus 510. In some implementations, the computer system 500 may further include a hardware security module (not shown).

The processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a system on a chip, a field programmable gate array (FPGA), a digital signal processor (DSP), network processor, or the like. The processing device 502 may be configured to execute instructions for performing any of the operations and steps discussed herein.

The computer system 500 illustrated in FIG. 5 further includes a network interface device 512. The computer system 500 also may include a video display 514 (e.g., a liquid crystal display (LCD), a light-emitting diode (LED), an organic light-emitting diode (OLED), a quantum LED, a cathode ray tube (CRT), a shadow mask CRT, an aperture grille CRT, or a monochrome CRT), one or more input devices 516 (e.g., a keyboard and/or a mouse or a gaming-like control), and one or more speakers 518 (e.g., a speaker). In one illustrative example, the video display 514 and the one or more input devices 516 may be combined into a single component or device (e.g., an LCD touchscreen).

The memory device 508 may include a computer-readable storage medium 502 on which the instructions 522c embodying any one or more of the methods, operations, or functions described herein are stored. The instructions 522c may also reside, completely or at least partially, within the main memory 504 as instructions 522b and/or within the processing device 502 during execution thereof by the computer system 500. As such, the main memory 504 or as instruction 522a and the processing device 502 also constitute computer-readable media. The instructions 522 may further be transmitted or received over a network via the network interface device 512.

While the computer-readable storage medium 520 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium capable of storing, encoding or carrying out a set of instructions for execution by the machine and that cause the machine to perform any one or more of the methods disclosed herein. The term "computer-readable storage medium" shall accordingly be taken to include, but not be limited to, solid-state memories, optical media, and magnetic media.

While the computer system environment of 500 shows the basic components the addition of a Hardware Security Module 524 associated with a Quantum Random Number Generator 526 are added to complete the entropy required for Post Quantum computations and interactions. The use of these components is critical as described previously in the overall methods used for this system.

No part of the description in this application should be read as implying that any particular element, step, or function is an essential element that must be included in the claim scope. The scope of patented subject matter is defined only by the claims. Moreover, none of the claims is intended to invoke 25 U.S.C. § 104(f) unless the exact words "means for" are followed by a participle.

The foregoing description, for purposes of explanation, use specific nomenclature to provide a thorough understanding of the described embodiments. However, it should be apparent to one skilled in the art that the specific details are not required to practice the described embodiments. Thus, the foregoing descriptions of specific embodiments are presented for purposes of illustration and description. They are not intended to be exhaustive or to limit the described embodiments to the precise forms disclosed. It should be apparent to one of ordinary skill in the art that many modifications and variations are possible in view of the above teachings.

The above discussion is meant to be illustrative of the principles and various embodiments of the present disclosure. Once the above disclosure is fully appreciated, numerous variations and modifications will become apparent to those skilled in the art. It is intended that the following claims be interpreted to embrace all such variations and modifications.

What is claimed is:

1. A method of verifying a cryptographic access code, comprising:
responsive to a set of cryptographic access components being quantum-aware:
obtaining a post-quantum encryption or decryption algorithm from a context-specific extension in a private Object Identifier (OID) namespace, the post-quantum encryption or decryption algorithm comprising at least one of:
SABER;
Kyber;
McEliece; or
Random Linear Code Encryption Scheme (RLCE); and
obtaining a post-quantum signature or verification algorithm from the private OID namespace;
validating a root of trust specified in a Trust Anchor Locator (TAL) record;
confirming that a respective certificate, Certificate Revocation List (CRL), or the TAL is specified in at least one Manifest record;
confirming that a hash of the respective certificate, the CRL, or the TAL matches a recorded hash associated with the respective certificate, the CRL, or the TAL in a respective Manifest listing the respective certificate, the CRL, or the TAL; and
confirming that the respective CRL or the Manifest is fresh.

2. The method of claim 1, further comprising communicating with instructions executed by an access or authorization device, and wherein the set of cryptographic access components includes the instructions.

3. The method of claim 2, wherein the access or authorization device comprises a Cryptographic Access Card (CAC).

4. The method of claim 2, wherein the private OID namespace is stored in the access or authorization device.

5. The method of claim 2, wherein the access or the authorization device comprises a payment card.

6. The method of claim 2, wherein communicating with the instructions executed by the access or authorization device comprises communicating via one or more modalities of direct connection with the access or the authorization device using
an integrated circuit (IC) chip reader;
a card reader; or
contactless communication.

7. The method of claim 1, further comprising, responsive to the set of cryptographic access components not being quantum-aware, obtaining an interoperable non-quantum encryption or decryption algorithm.

8. The method of claim 1, further comprising:
checking specification compliance of a public key infrastructure (PKI) object;
discovering a path from a certificate to the root of trust; and
computationally validating the path.

9. A computing system configured to verify a cryptographic access code, the computing system comprising:
a non-transitory memory; and
at least one processor coupled to the non-transitory memory and configured to:
responsive to a set of cryptographic access components being quantum-aware:
obtain a post-quantum encryption or decryption algorithm from a context-specific extension in a private Object Identifier (OID) namespace, the post-quantum encryption or decryption algorithm comprising at least one of:
SABER;
Kyber;
McEliece; or
Random Linear Code Encryption Scheme (RLCE); and
obtain a post-quantum signature or verification algorithm from the private OID namespace;
validate a root of trust specified in a Trust Anchor Locator (TAL) record;
confirm that a respective certificate, Certificate Revocation List (CRL), or the TAL is specified in at least one Manifest record;
confirm that a hash of the respective certificate, the CRL, or the TAL matches a recorded hash associated with the respective certificate, the CRL, or the TAL in a respective Manifest listing the respective certificate, the CRL, or the TAL; and
confirm that the respective CRL or the Manifest is fresh.

10. The computing system of claim 9, wherein the at least one processor is further configured to communicate with instructions executed by an access or authorization device, and wherein the set of cryptographic access components includes the instructions.

11. The computing system of claim 10, wherein the access or authorization device comprises a Cryptographic Access Card (CAC).

12. The computing system of claim 10, wherein the private OID namespace is stored in the access or the authorization device.

13. The computing system of claim 10, wherein the access or the authorization device comprises a payment card.

14. The computing system of claim 10, wherein to communicate with the instructions executed by the access or the authorization device comprises to communicate via one or more modalities of direct connection with the access or the authorization device using
an integrated circuit (IC) chip reader;
a card reader; or
contactless communication.

15. The computing system of claim 9, wherein the at least one processor is further configured, responsive to the set of cryptographic access components not being quantum-aware, to obtain an interoperable non-quantum encryption or decryption algorithm.

16. The computing system of claim 9, wherein the at least one processor is further configured to:
check specification compliance of a public key infrastructure (PKI) object;
discover a path from a certificate to the root of trust; and
computationally verify the path.

17. A non-transitory computer readable medium storing executable sequences of instructions to:
responsive to a set of cryptographic access components being quantum-aware:
specify a post-quantum encryption or decryption algorithm within a context-specific extension in a private Object Identifier (OID) namespace, the post-quantum encryption or decryption algorithm comprising at least one of:
SABER;
Kyber;
McEliece; or
Random Linear Code Encryption Scheme (RLCE); and
specify a post-quantum signature or verification algorithm within the private OID namespace;
specify a root of trust within a Trust Anchor Locator (TAL) record;
specify a respective certificate, Certificate Revocation List (CRL), or the TAL in at least one Manifest record;
provide a hash of the respective certificate, the CRL, or the TAL, wherein the hash matches a recorded hash associated with the respective certificate, the CRL, or the TAL in a respective Manifest listing the respective certificate, the CRL, or the TAL; and
provide a future update field for the respective CRL or the Manifest.

18. The non-transitory computer readable medium of claim 17, wherein the instructions are configured to be executed by an access or authorization device, and wherein the set of cryptographic access components includes the instructions.

19. The non-transitory computer readable medium of claim 18, wherein the non-transitory computer readable medium is configured to be read by the access or authorization device via one or more modalities of direct connection with the access or the authorization device using
an integrated circuit (IC) chip reader;
a card reader; or
contactless communication.

20. The non-transitory computer readable medium of claim 17, wherein the non-transitory computer readable medium is stored within a Cryptographic Access Card (CAC).

21. The non-transitory computer readable medium of claim 17, wherein the non-transitory computer readable medium is stored within a payment card.

22. The non-transitory computer readable medium of claim 17, wherein the private OID namespace is stored within the non-transitory computer readable medium.

23. The non-transitory computer readable medium of claim 17, wherein the instructions further comprise instructions, responsive to the set of cryptographic access components not being quantum-aware, to specify an interoperable non-quantum encryption or decryption algorithm.

24. The non-transitory computer readable medium of claim 17, wherein the instructions further comprise instructions to:
check specification compliance of a public key infrastructure (PKI) object;
discover a path from a certificate to the root of trust; and
computationally validate the path.

* * * * *